Patented May 14, 1935

2,001,284

UNITED STATES PATENT OFFICE 2,001,284

MANUFACTURE OF ANILINE FROM CHLOROBENZENE AND AMMONIA

Walter Prahl and Wilhelm Mathes, Ludwigshafen-on-the-Rhine, Germany, assignors to Dr. F. Raschig G. m. b. H., Ludwigshafen-on-the-Rhine, Bavaria, Germany, a firm of Germany No Drawing. Application October 14, 1931, Serial No. 568,866. In Germany October 23, 1930.

14 Claims. (Cl. 260—130.5)

It is known that remarkable quantities of aniline besides other products are formed by treating liquid chlorobenzene with ammonia at elevated temperatures and pressures. It has been repeatedly tried to substitute an operation in the vapor phase for the operation in the liquid phase which is delicate and comparatively dangerous especially in consequence of the high pressures used. Chlorobenzene and ammonia have been passed at different temperatures over several catalysts consisting for instance of nickel, sodium carbonate, lime and the like and it has been tried to facilitate the reaction by adding other gases. However, the result of all these experiments was that the formation of aniline was absolutely unsatisfactory and that by using the catalysts hitherto proposed the formation of by-products in proportion to the quantity of aniline formed at the same time was rather increased than decreased.

Under the circumstances it was not probable that it would be possible to find a process suitable for industrial production of aniline by passing chlorobenzene in the vapor phase together with ammonia over catalysts.

However, we have found that very high yields approximating 100% of aniline can be obtained by passing chlorobenzene vapor and ammonia at an elevated temperature over catalysts comprising at the same time at least one representative of each of two classes of substances which are defined as follows. The first class comprises the metals copper, cobalt, nickel, iron and their compounds, while the second class comprises those elements of groups 5 and 6 of the periodic system which are solid at room temperature and of which the salts are not precipitated as hydroxides by adding ammonium sulfide to their aqueous solution and the compounds of such elements.

Preferably the catalysts complying with these requirements are distributed in known manner on carriers having a large surface area such as silica gel, bleaching earth, pumice stone, metal oxides and the like.

Among the combinations of substances suitable as catalysts according to this invention those catalysts are especially efficient which contain copper or its compounds as the representatives of the first class, the second class being represented by substances having a decidedly acid character, such as for instance phosphoric acid, vanadic acid, molybdic acid or tungstic acid.

The qualities of these catalysts may be improved especially in respect of resistance and efficiency by introducing more than one representative of the second class of substances besides copper or its compounds. Among the possible combinations it has been found especially useful to introduce phosphoric acid together with substances capable of forming heat resistant complex compounds with phosphoric acid. The most important compounds of this character are molybdic and tungstic acid.

The sequence and the shape in which these constituents are combined to form a catalyst or are applied to their carrier have no substantial influence on their action or their efficiency.

When these catalysts are used the reaction between chlorobenzene and ammonia begins at about 250° C. The temperature most favorable with respect to the degree of reaction and to the yield is from about 300 to 450° C., depending upon the nature of the catalyst used. Below 300° C. the degree of reaction is in most cases too small for allowing industrial application; above 450° C. the yield decreases materially in consequence of secondary reactions. At higher temperatures, an upper limit is soon reached insofar as commercial interest in the reaction is concerned, for, as already stated, the reaction then becomes quite unfavorable. This is due principally to the reduction in amount of the output of the aniline obtained and the increased proportion of undesirable by-products produced. As being a matter of perhaps academic interest, it may be further stated that at yet higher temperatures than definitely given herein, it is nevertheless still possible to obtain a small output of aniline, although the by-products and unfavorable features render the reaction too expensive and impractical to use.

It is advisable to allow the reaction to proceed in the presence of an essential excess of ammonia, say for instance at least 1.5 of the theoretical quantity and to transform during one passage over the catalyst not more than about 20% of the quantity of chlorobenzene present, as otherwise substantial quantities of diphenylamine are formed instead of aniline.

The aniline formed during the passage over the catalyst can be separated from the gas mixture in known manner. Preferably the hot gaseous mixture issuing from the contact oven is cooled down to normal temperature after separation of the ammonia chloride formed. The remaining ammonia gas is returned to the cycle of operations and aniline is separated by fractional distillation from the liquified mixture of chlorobenzene and aniline. The chlorobenzene may also be returned into the cycle of operations. It is also possible to separate aniline with a little chlorobenzene by fractional condensation of the mixture and to return the remaining mixture of chlorobenzene and ammonia into the cycle and to pass it again over the contact, the quantities spent in the reaction being replaced by new material, if desired.

Example 1

1000 ccm. of silica gel are impregnated with a solution of 50 g. of ammonium phosphate, 50 g. of ammonium tungstate and 20 g. of cupric chloride in 300 ccm. of water. The mass is dried on the water bath and above this catalyst there is passed at 400° C. a current of chlorobenzene corresponding to a vaporized quantity of 300 g. per hour and mixed with 50 litres of gaseous ammonia per hour. The hot gases issuing from the oven are cooled and the aniline is separated in known manner from the chlorobenzene. After separation the yield is 45 g. of aniline per hour.

Example 2

100 g. of ammonium molybdate and 10 g. of cupric chloride are dissolved in 300 ccm. of water and poured on 1000 ccm. of Florida earth. The dry mixture is used as the catalyst over which there are passed at 350° C. the vapors of 250 g. of vaporized chlorobenzene and 50 litres of ammonia per hour. By separation in the usual way 25 g. of aniline are obtained per hour.

Example 3

60 g. of ammonium vanadate, 80 g. of ammonium phosphate and 20 g. of nickel chloride (NiCl₂) are dissolved in 600 ccm. of water and poured on 1200 ccm. of aluminium hydroxide. The mass is dried and over this catalyst there are passed at 450° C. the vapors of 400 g. of chlorobenzene and 60 litres of ammonia per hour. The yield is 30 g. of aniline per hour.

Example 4

50 g. of ammonium molybdate are dissolved in hot water and mixed with 75 g. of phosphoric acid. With this solution 1000 ccm. of silica gel are impregnated and the mass is dried some hours on the water bath. A solution of 25 g. of manganese chloride and 20 g. of cupric chloride in water is poured on the mass which is then again dried. By passing over this catalyst at 400° C. the vapors of 300 g. of chlorobenzene and 25 litres of gaseous ammonia per hour 30 g. of aniline per hour are obtained which may be separated in the known manner.

What we claim is:

1. The process of manufacturing aniline by passing a mixture of chlorobenezne vapor and ammonia at a temperature of from about 250° to about 450° C., over a catalyst which consists mainly of at least one of those elements of groups 5 and 6 of the periodic system which are solid at room temperature and form salts which are not precipitated by ammonium sulfide as hydroxides from their aqueous solutions, and at least one of the metals copper, cobalt, nickel and iron.

2. The process of manufacturing aniline by passing a mixture of chlorobenzene vapor and ammonia at a temperature of about 250° C. to about 450° C., over a catalyst which consists mainly of copper and at least one compound of decidedly acid character of one of those elements of groups 5 and 6 of the periodic system which are solid at room temperature and of which the salts are not precipitated by ammonium sulfide as hydroxides from their aqueous solutions.

3. The process of manufacturing aniline by passing a mixture of chlorobenzene vapor and ammonia at a temperature of about 250° C. to about 450° C., over a catalyst which consists mainly of at least one of the compounds phosphoric acid, vanadic acid, molybdic acid and tungstic acid and at least one of the metals copper, cobalt, nickel and iron, the catalyst being precipitated on a suitable carrier.

4. The process of manufacturing aniline by passing a mixture of chlorobenzene vapor and ammonia at a temperature of about 250° C. to about 450° C., over a catalyst which consists mainly of phosphoric acid in combination with at least one compound capable of forming complex phosphoric acid compounds, of one of those elements of groups 5 and 6 of the periodic system which are solid at room temperature and of which the salts are not precipitated by ammonium sulfide as hydroxides from their aqueous solutions and at least one of the metals copper, cobalt, nickel and iron, the catalyst being precipitated on a suitable carrier.

5. The process of manufacturing aniline by passing a mixture of chlorobenzene vapor and ammonia at a temperature of about 250° C. to about 450° C., over a catalyst which mainly consists of phosphoric acid in combination with a tungsten compound capable of forming complex phosphoric acid compounds and at least one of the metals copper, cobalt, nickel and iron, the catalyst being precipitated on a suitable carrier.

6. The process of manufacturing aniline by passing a mixture of chlorobenzene vapor and ammonia at a temperature of from about 250° to about 450° C., over a catalyst which consists mainly of phosphoric acid in combination with a molybdenum compound capable of forming complex phosphoric acid compounds and at least one of the metals copper, cobalt, nickel and iron, the catalyst being precipitated on a suitable carrier.

7. The process of manufacturing aniline by passing a mixture of the vapors of 300 g. of chlorobenzene and 50 litres of gaseous ammonia per hour at 400° C. over a catalyst consisting of 1000 ccm. of silica gel impregnated with a solution of 50 g. of ammonium phosphate, 50 g. of ammonium tungstate and 20 g. of cupric chloride, cooling the hot gases issuing from the oven and separating the aniline from the chlorobenzene.

8. The process of manufacturing aniline by passing a mixture of the vapors of 250 g. of chlorobenzene and 50 litres of ammonia per hour at 350° C. over a catalyst consisting of 1000 ccm. of Florida earth impregnated with 100 g. of ammonium molybdate and 10 g. of cupric chloride and separating the aniline from the gases issuing from the oven.

9. The process of manufacturing aniline by passing the vapors of 400 g. of chlorobenzene and 60 litres of gaseous ammonia at 450° C. over a catalyst consisting of 1200 ccm. of aluminium hydroxide impregnated with 60 g. of ammonium vanadate, 80 g. of ammonium phosphate and 20 g. of nickel chloride and separating the aniline from the gases issuing from the oven.

10. The process of manufacturing aniline by passing a mixture of chlorobenzene vapor and a material excess of ammonia at a temperature of about 250° C. to about 450° C. over a catalyst which consists mainly of at least one of those elements of groups 5 and 6 of the periodic system which are solid at room temperature and of which the salts are not precipitated by ammonium sulfide as hydroxides from their aqueous solutions and at least one of the metals copper, cobalt, nickel and iron.

11. The process of manufacturing aniline by passing a mixture of chlorobenzene vapor and ammonia at a temperature of about 250° C., to about 450° C., over a catalyst which consist mainly of at least one of those elements of groups 5 and 6 of the periodic system which are solid at room temperature and of which the salts are not precipitated by ammonium sulfide as hydroxides from their aqueous solutions and at least one of the metals copper, cobalt, nickel and iron, the speed of flow of the mixture of vapors being so regulated that not more than about 20% of the chlorobenzene present is transformed into aniline during one passage.

12. The process of manufacturing aniline by passing a mixture of chlorobenzene vapor and ammonia at a temperature of about 250° C., to about 450° C., over a catalyst which consists mainly of at least one of those elements of groups 5 and 6 of the periodic system which are solid at room temperature and of which the salts are not precipitated by ammonium sulfide as hydroxides from their aqueous solutions and at least one of the metals copper, cobalt, nickel and iron, separating the aniline from the gases issuing from the oven and returning into the cycle the chlorobenzene and ammonia recovered after separation of the aniline from the reaction mixture.

13. The process of manufacturing aniline by passing a mixture of chlorobenzene vapor and ammonia at a temperature of from about 250° C., to about 450° C., over a catalyst which consists mainly of a compound of at least one element of those found in groups 5 and 6 of the periodic system which is solid at room temperature and forms salts which are not precipitated by ammonium sulfide as hydroxides from their aqueous solutions, and at least one of the metals copper, cobalt, nickel and iron.

14. The process of manufacturing aniline by passing a mixture of chlorobenzene vapor and ammonia at a temperature ranging from about 250° C. upward to a temperature at which the reaction becomes unfavorable over a catalyst consisting mainly of at least one element of those found in groups 5 and 6 of the periodic system which is solid at room temperature and forms salts which are not precipitated by ammonium sulfide as hydroxides from their aqueous solutions, and at least one of the metals copper, cobalt, nickel and iron.

WILHELM MATHES.
WALTER PRAHL.